Patented Dec. 12, 1939

2,183,317

UNITED STATES PATENT OFFICE 2,183,317

MANUFACTURE OF CELLULOSE DERIVATIVE COMPOSITIONS

Harold Ailden Auden, Banstead, Hanns Peter Staudinger, Sutton, and Henry Malcolm Hutchinson, Banstead, England, assignors to The Distillers Company Limited, Edinburgh, Scotland, a British company No Drawing. Application May 3, 1937, Serial No. 140,578. In Great Britain May 18, 1936

19 Claims. (Cl. 106—40)

This invention relates to the manufacture of cellulose derivative compositions; more specifically stated it relates to cellulose esters of organic acids (thus excluding nitro-cellulose) and particularly but not exclusively, it relates to fully esterified cellulose acetate.

It is known that some of the lower acetals such as ethylene glycol formal, propylene glycol formal and diethyl acetal have solvent properties for certain cellulose esters. It is also known to use for plasticising purposes acetals of polyhydric alcohols. It has also been proposed to add to cellulose derivatives as a softener therefor an acetal having more than one ether group outside the acetal nucleus and having a relatively low vapour pressure, and the acetals we use as hereinafter defined do not include the aforesaid acetals.

According to the present invention we incorporate acetals with cellulose esters of organic acids but the acetals we employ are products containing seven or more carbon atoms obtained by condensing formaldehyde, acetaldehyde or other aldehydes with higher aliphatic monohydric alcohols, monohydric hydroaromatic alcohols (e. g. cyclohexanol) or monohydric aromatic alcohols (e. g. benzyl alcohol) either in their unsubstituted state or at least containing no oxygen-containing substituting group. Halogen substituted monohydric alcohols are particularly suitable. Such acetals have valuable properties as solvents, softening agents, or platicising agents for a wide range of cellulose esters. Only a minor proportion of the acetal need be used.

The acetals we employ may be prepared by condensation of the respective alcohols and aldehydes at a suitable temperature and pressure in the presence of a catalyst and/or a dehydrating agent, such as calcium chloride, zinc chloride or a mineral acid. The water formed during the reaction is preferably removed by an entraining agent such as benzene which by distillation carries off the water with it.

Example 1

Cyclohexanol (2 mols.) and paraformaldehyde (equivalent to one mol. of formaldehyde) were warmed together in the presence of anhydrous calcium chloride. Heating at about 100° C. was continued until water ceased to be formed. The mixture was then allowed to cool and stand until the aqueous layer had separated. The aqueous layer was removed and the remainder was dried and fractionated by distillation, whereby the desired condensation product (cyclohexyl formal) was obtained.

30 gm. of cellulose triacetate were dissolved in a mixture of 120 cc. methylene chloride and 30 cc. absolute ethyl alcohol. When the triacetate had completely dissolved, 11.2 gm. of the cyclohexyl formal in 30 cc. methylene chloride were added and the mixture was filtered. Films formed from the filtered liquid were found to be exceptionally pliable and have an excellent tensile strength and elongation under tension.

Example 2

154 parts by weight of benzyl alcohol and 22 parts by weight of paraformaldehyde were heated to 110° C. so that the paraformaldehyde dissolved. 15 parts by weight of anhydrous calcium chloride were added and the mixture was allowed to stand for 12 hours at 20–28° C. The upper layer of liquid was decanted off and refluxed with benzene in an entraining apparatus until no further water is evolved. The benzene was then distilled off and the benzyl formal isolated by fractional distillation under vacuum.

30 gms. cellulose triacetate were dissolved in 150 cc. methylene chloride and 20 cc. ethyl alcohol. 10 gm. of the benzyl formal were incorporated and the liquid was filtered. This composition formed clear, tough and pliable films on evaporation.

Example 3

258 parts by weight dichlorhydrin and 31 parts by weight paraformaldehyde were heated together until the latter had dissolved. 20 parts by weight of anhydrous calcium chloride were then added and the mixture was allowed to stand for 24 hours. The upper layer of liquid was then decanted and refluxed with benzene in an entraining apparatus with a little fresh calcium chloride until water ceased to be evolved. The liquid was filtered and the dichlorhydrin formal was separated by fractional distillation under reduced pressure.

30 gms. cellulose tri-acetate were dissolved in 150 cc. acetone and 20 cc. alcohol. 5 gms. of the dichlorhydrin formal were incorporated. This solution formed films of excellent pliability and tensile strength on evaporation.

Example 4 n-Hexyl alcohol and paraformaldehyde were condensed by refluxing with phosphoric acid, using benzene as entraining agent for removal of the water. On completion of the reaction the product was fractionally distilled, preferably under vacuum.

Films made from cellulose triacetate and from cellulose aceto-crotonate using the n-hexyl alcohol formal as plasticiser were found to have considerable pliability.

What we claim is:

1. A composition comprising essentially a cellulose ester of an organic acid and an acetal containing two oxygen atoms and at least 7 carbon atoms and resulting from condensation of an aldehyde with a monohydric alcohol containing a single oxygen atom.

2. A composition comprising essentially a cellulose ester of an organic acid and an acetal containing two oxygen atoms and at least 7 carbon atoms and resulting from condensation of an aldehyde with an unsubstituted monohydric alcohol.

3. A composition comprising essentially a cellulose ester of an organic acid and an acetal containing two oxygen atoms and at least 7 carbon atoms and resulting from condensation of an aldehyde with a halogen substituted monohydric alcohol containing a single oxygen atom.

4. A composition comprising essentially a cellulose ester of an organic acid and an acetal containing two oxygen atoms and at least 7 carbon atoms and resulting from condensation of an aldehyde with a chlorine substituted monohydric alcohol containing a single oxygen atom.

5. A composition comprising essentially a cellulose ester of an organic acid and a minor proportion of an acetal containing two oxygen atoms and at least 7 carbon atoms and resulting from condensation of an aldehyde with a monohydric alcohol containing a single oxygen atom.

6. As a plasticiser for cellulose esters of organic acids in film form, an acetal containing two oxygen atoms and at least 7 carbon atoms and resulting from condensation of an aldehyde with a monohydric alcohol containing a single oxygen atom.

7. In the manufacture of cellulose derivative compositions, the steps of dissolving the cellulose ester of an organic acid in a solvent therefor, and incorporating therein a minor proportion of an acetal containing two oxygen atoms and at least 7 carbon atoms and resulting from condensation of an aldehyde with a monohydric alcohol containing a single oxygen atom.

8. A composition comprising essentially fully esterified cellulose acetate and a minor proportion of an acetal containing two oxygen atoms and at least 7 carbon atoms and resulting from condensation of an aldehyde with a monohydric alcohol containing a single oxygen atom.

9. A composition comprising essentially fully esterified cellulose acetate and a minor proportion of an acetal containing two oxygen atoms and at least 7 carbon atoms and resulting from condensation of an aldehyde with an unsubstituted monohydric alcohol.

10. A composition comprising essentially fully esterified cellulose acetate and a minor proportion of an acetal containing two oxygen atoms and at least 7 carbon atoms and resulting from condensation of an aldehyde with a halogen substituted monohydric alcohol containing a single oxygen atom.

11. A composition comprising essentially fully esterified cellulose acetate and a minor proportion of an acetal containing two oxygen atoms and at least 7 carbon atoms and resulting from condensation of an aldehyde with a chlorine substituted monohydric alcohol containing a single oxygen atom.

12. A composition comprising essentially a cellulose ester of an organic acid and a minor proportion of cyclohexanyl formal.

13. A composition comprising essentially a cellulose ester of an organic acid and a minor proportion of benzyl formal.

14. A composition comprising essentially a cellulose ester of an organic acid and a minor proportion of n-hexyl formal.

15. A composition comprising essentially fully esterified cellulose acetate and a minor proportion of cyclohexanyl formal.

16. A composition comprising essentially fully esterified cellulose acetate and a minor proportion of benzyl formal.

17. A composition comprising essentially fully esterified cellulose acetate and a minor proportion of n-hexyl formal.

18. A composition comprising essentially a cellulose ester of an organic acid and a minor proportion of an acetal containing at least 7 carbon atoms and corresponding to the following general formula: $R'—CH(OR^2)_2$ wherein $R'$ is a member of the group consisting of hydrogen and alkyl, and $R^2$ is a hydrocarbon radical of the group consisting of alkyl, aryl, aralkyl, cycloaliphatic radicals and their halogen-substituted derivatives.

19. A composition comprising essentially a fully esterified cellulose acetate and a minor proportion of an acetal containing at least 7 carbon atoms and corresponding to the following general formula: $R'—CH(OR^2)_2$ wherein $R'$ is a member of the group consisting of hydrogen and alkyl, and $R^2$ is a hydrocarbon radical of the group consisting of alkyl, aryl, aralkyl, cycloaliphatic radicals and their halogen-substituted derivatives.

HAROLD ALLDEN AUDEN.
HANNS PETER STAUDINGER.
HENRY MALCOLM HUTCHINSON.